Patented Oct. 27, 1925.

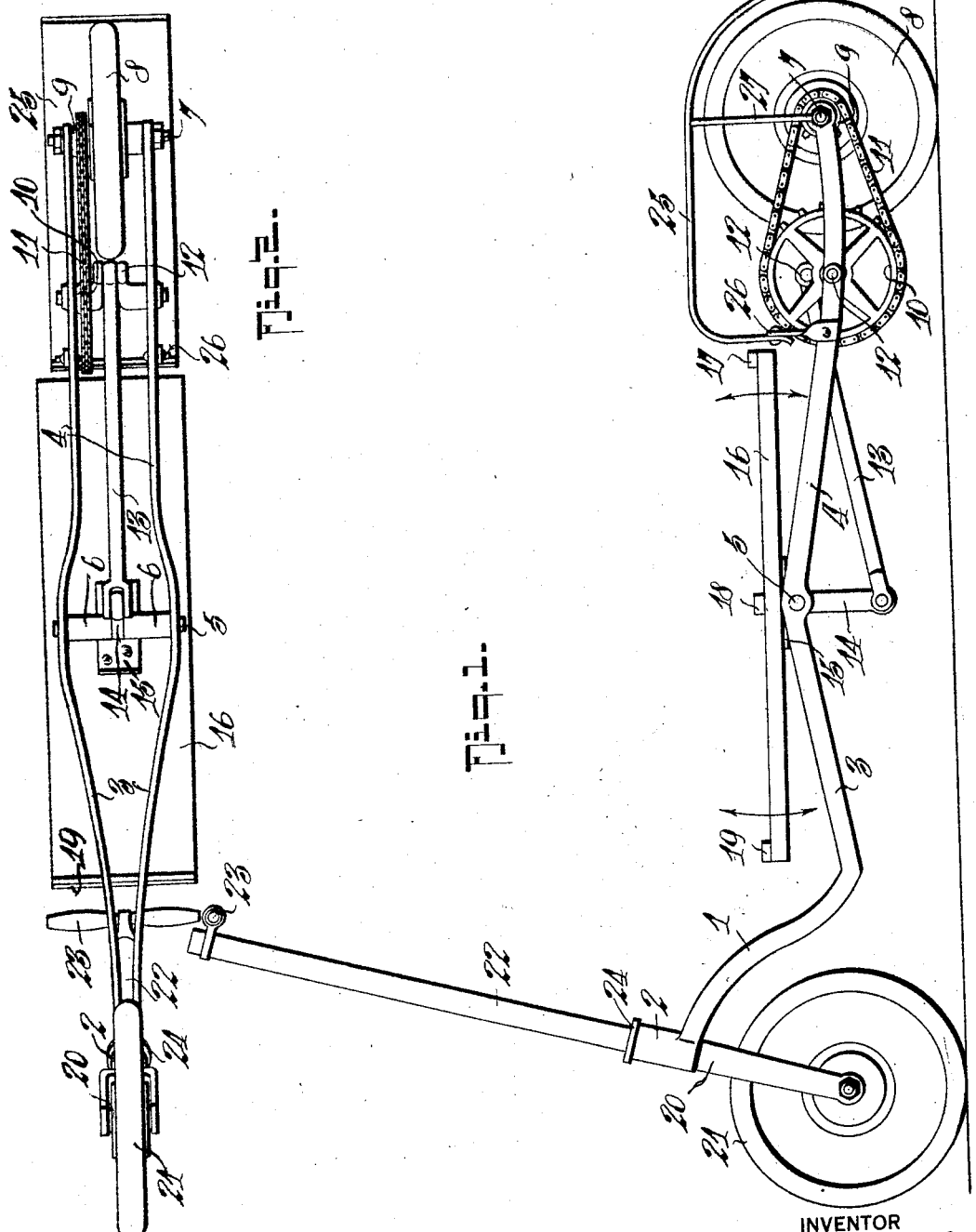

1,558,851

UNITED STATES PATENT OFFICE.

LABROT S. EDWARDS AND ROBERT O. CASE, OF PORTLAND, OREGON.

TEETER CAR.

Application filed May 18, 1925. Serial No. 31,116.

*To all whom it may concern:*

Be it known that we, LABROT S. EDWARDS and ROBERT O. CASE, citizens of the United States, and residents of Portland, in the county of Multnomah and State of Oregon, have invented certain new and useful Improvements in Teeter Cars, of which the following is a specification.

Our invention has for its object to provide certain new and useful improvements in vehicles operated by the weight of the person upon the same.

The invention particularly has for its object to provide a vehicle of the character stated in which the operator stands on a teetering platform directly over the fulcrum of the platform and causes the platform to teeter by shifting the weight of the body forwardly or backwardly while standing erect, the motions of the platform being communicated to a driving wheel by means of crank and pitmen connections.

More specifically the invention has for its object to provide an improvement on the well-known "two wheel scooter," such means being of a character that will enable the operator to stand upright utilizing his full weight at all times to impart motion to the vehicle through the teetering platform and the crank and pitmen driving connections, etc., etc.

More specifically the invention resides in those novel features of construction, combination and arrangement of parts, all of which will be first fully described, then be pointed out in the appended claims and illustrated in the accompanying drawing, in which:—

Figure 1 is a side elevation of my invention, the position of the operator on the teetering platform being indicated in dotted lines.

Figure 2 is an inverted plan view of the parts shown in Figure 1.

In the drawing in which like numerals of reference indicate like parts in all of the figures, the frame of the vehicle is constructed of a pair of side bars having the front inclined portions 1—1 carrying the steering head 2, in which the steering post 22 is journalled. The frame also includes the diverging side bar portions 3—3 and 4—4, the bars 3—3 being a continuation of the bar portions 1 and being inclined downwardly from the center or juncture of the bar portions 3 and 4 to allow the teetering movement of the platform 16 to take place and also to serve as stops to limit that movement. The bar portions 4—4 extend rearwardly and carry the supporting spindles 7 for the rear or driving wheel 8. The wheel 8 is provided with a sprocket 9 that is connected by a chain 11 to a driving sprocket 10 on a crank shaft 12 that is fulcrumed in bearing apertures in the side bar portions 4—4 and is operated by a pitman 13 connected to the lever 14 that is secured at 15 to the under side of the platform 16 centrally thereof. The platform 16 and lever 14 thus form a double bell crank or T lever. The platform is journalled with cleats 17, 18 and 19, as shown, the cleats 17 and 19 being at the ends of the platform, while the cleat 18 is in the middle approximately over the fulcrum axis. The fulcrum axis consists of a suitable fulcrum rod or bolt 5 carrying spacing collars 6 at each side of the lever 14.

20 is the fulcrum for the front or steering wheel 21, and 24 designates a collar to retain the steering post 22 in its bearing 2, while 23 is a handle for turning the post 22 for the usual purpose of steering.

The driving wheel 8, chain 11, sprockets 9 and 10, are guarded by a shield 25 that is mounted on supports 26—27, as shown.

As shown in dotted lines in Figure 1, the operator stands on the platform 16 with one foot in the space between the cleats 18 and 19 and the other foot in the space between the cleats 18 and 17, thus directing the weight of his body directly over the fulcrum 5. For shifting that weight forwardly or backwardly, he imparts a teetering motion to the platform 16 and thereby drives the vehicle.

By reason of the construction shown and described, it will be seen that the operator may stand erect and utilize his full weight at all times through the use of the T member which imparts the thrust to the pitman or connecting rod that in turn effects the propulsion of the driving wheel through the sprocket and chain connection, gears, or other suitable means of like character that may be provided for the purpose.

It will be seen that our invention is of a very simple construction, can be easily and cheaply manufactured and will readily serve its intended purposes.

What we claim is:

1. A teeter car comprising a frame, a driving wheel journalled at one end of said frame and a steering wheel mounted at the other end of said frame, said frame including forwardly and rearwardly inclined parts, a teeter platform mounted above said inclined parts, means for pivoting said platform at approximately its mid-length to said frame at the juncture of said inclined parts, a lever arm projecting from said platform at its pivot place, a crank shaft journalled in said frame and operative connections between said lever and crank shaft and between said crank shaft and said driving wheel.

2. A teeter car comprising a frame composed of two side bars united at the front to a steering post bearing sleeve, a steering post with fork handle and steering wheel, said post being mounted in said sleeve, a driving wheel mounted on and between the rear ends of said frame bars, a crank shaft mounted between said bars in front of said driving wheel, operating connections between said crank and said driving wheel, said bars having raised mid portions, a teeter platform pivoted to said bars at the raised side portion thereof, the pivotal axis lying approximately midway the ends of the platform, a lever arm extended down from the pivotal axis and movable as a unit with said platform, and a pitman connecting said lever arm with said crank shaft.

3. A teeter car comprising a frame composed of two side bars united at the front to a steering post bearing sleeve, a steering post with fork handle and steering wheel, said post being mounted in said sleeve, a driving wheel mounted on and between the rear ends of said frame bars, a crank shaft mounted between said bars in front of said driving wheel, operating connections between said crank and said driving wheel, said bars having raised mid portions, a teeter platform pivoted to said bars at the raised side portion thereof, the pivotal axis lying approximately midway the ends of the platform, a lever arm extended down from the pivotal axis and movable as a unit with said platform, a pitman connecting said lever arm with said crank shaft, and cleats mounted on said platform, there being one cleat directly above the pivot axis and one at each end of the platform.

LABROT S. EDWARDS.
ROBERT O. CASE.